United States Patent [19]

Walter et al.

[11] 4,408,809
[45] Oct. 11, 1983

[54] SEAL, ESPECIALLY FOR WHEEL BEARING ARRANGEMENTS FOR VEHICLES

[75] Inventors: Lothar Walter, Schweinfurt; Horst M. Ernst, Eltingshausen; Manfred Brandenstein, Eussenheim; Heinz Kiener, Waigolshausen; Wolfgang Friedrich, Schweinfurt, all of Fed. Rep. of Germany

[73] Assignee: SKF Industries, Inc., King of Prussia, Pa.

[21] Appl. No.: 248,277

[22] Filed: Mar. 27, 1981

[30] Foreign Application Priority Data

Mar. 29, 1980 [DE] Fed. Rep. of Germany ....... 3012421

[51] Int. Cl.$^3$ ........................ F16C 33/00; F16C 33/76
[52] U.S. Cl. ................................. 308/187.1; 308/191
[58] Field of Search .................. 308/187.1, 187, 187.2, 308/36.1, 191; 277/92, 90, 94, 189

[56] References Cited

U.S. PATENT DOCUMENTS

| 2,639,954 | 5/1953 | Potter | 308/187.2 |
|---|---|---|---|
| 3,250,580 | 5/1966 | Sikora | 308/187.1 |
| 3,439,963 | 4/1969 | Hein et al. | 308/187 X |
| 3,519,316 | 7/1970 | Gothberg | 308/187.2 X |
| 3,597,030 | 8/1971 | Hallerback | 308/187.2 |
| 3,709,572 | 1/1973 | Pethis | 277/94 X |
| 3,936,105 | 2/1976 | Asberg | 308/187.1 |
| 4,033,643 | 7/1977 | Miller et al. | 308/187.2 |
| 4,040,683 | 8/1977 | Korenhof | 277/94 X |
| 4,106,827 | 8/1978 | Ducret et al. | 308/187.1 |
| 4,118,080 | 10/1978 | Kregler et al. | 308/187.1 |

FOREIGN PATENT DOCUMENTS

| 2137708 | 2/1973 | Fed. Rep. of Germany | 308/191 |
|---|---|---|---|
| 147456 | 10/1954 | Sweden | 277/94 |
| 1455154 | 11/1976 | United Kingdom | 308/191 |

Primary Examiner—Stuart S. Levy
Assistant Examiner—Daniel P. Stodola
Attorney, Agent, or Firm—Daniel M. Rosen

[57] ABSTRACT

A wheel bearing has inner and outer bearing rings each having a radially outwardly directed flange, and a plurality of rolling elements arranged between the rings. An annular seal has a support element affixed to the outer ring, the support element terminating in an annular elastic element of oil resistant material that is slidably engages the inner ring. A cover extends over the flange of the inner ring and has an end terminating radially spaced from a shoulder of the outer ring, to define a sealing gap. The intermediate portion of the cover defines a lubricant accumulation space.

12 Claims, 3 Drawing Figures

SEAL, ESPECIALLY FOR WHEEL BEARING ARRANGEMENTS FOR VEHICLES

This invention relates to a seal, especially for the wheel bearing for vehicles, having two end rings with radially directed flanges, and rolling bodies arranged between the bearing rings. A bearing of this type has a seal element affixed to the outer ring, the seal element having a free end slidably engaging the inner ring. In addition, a cover piece is mounted to extend radially thereover, and has a free end directed to extend to a position spaced from an opposing surface of the other bearing ring with minimum play.

Seals for wheel bearings of this type are known. In one known arrangement a seal of an elastic material is held over a projecting section, for example, to the side of the outer ring directed toward the flange of the inner ring. The free end of the seal is split into two lips, of which one slidingly runs in the fillet at the junction between the inner ring shoulder and the mounting flange and the other slides on the radially directed facing surface of the flange. A further sheet metal piece is affixed to the outer ring on the holding projection for the seal. This sheet metal piece covers the intermediate space between the outer ring and the flange of the inner ring with its sleeve-shaped section, and terminates with its facing surface only a small distance from the facing surface of the flange, to form a narrow sealing space as disclosed in Kregler et al, U.S. Pat. No. 4,118,080. The outer sheet metal piece of this arrangement serves the function of insuring an elastic seal, and preventing coarse contaminants from the outside from being forced through the sliding seal. This arrangement has the disadvantage that the assembly of the wheel bearing, besides being complicated due to the provision of the two flanges and the two bearing rings, is additionally made difficult since the cover piece, which is fabricated mostly of sheet metal, cannot be axially slid on the assembly of the wheel bearing arrangement, without the use of additional devices, since the outer ring of the bearing must be tilted for the purpose of filling the rolling bodies between the bearing rings, or must be capable of being displaced radially outwardly and also in the axial direction with respect to the inner ring, for the same purpose. In addition, escaping lubricant can leak through the space between the facing surface of the cover piece and the facing surface of the flange, from the sliding seal, and can enter the brake mounted adjacent the bearing. This can lead to destruction of the related parts of the vehicle.

It is therefore an object of the present invention to provide a seal of the above described type, which not only insures a simpler assembly of the wheel bearing, but also prevents escape of the lubricant of the wheel bearing and prevents damaging materials from the outside from being forced into the bearing. The invention also is directed to restrain reflection of heat from the brake to the bearing, especially to the sliding seal.

The above objective is solved, in accordance with the present invention, by providing a structure in which the cover piece is affixed to the flange of the inner ring, the free end thereof overlying a facing surface of the outer ring with minimum play. As a consequence, a lubricant accumulation space is formed between the mounting section of the cover piece and the free end thereof.

By mounting the cover piece on the flange of the inner ring, the assembly of the bearing is facilitated and, in addition, due to the provision of the lubricant accumulation space, also the sealing is improved. The cover piece serves also as a heat shield, and prevents the heat radiated from the brake from acting on the seal element, and destroying the material of the seal. As a consequence, a long life of the seal, and thereby the wheel bearing arrangement, is insured.

The arrangement of the invention has an additional advantage, if the cover piece is sleeve-shaped and has an inwardly directed section, which, together with the mounting flange defines the lubricant accumulation space.

If the cover piece is mounted on the outer surface of the inner ring, in accordance with a further embodiment of the invention, it is possible due to the use of the sleeve-shaped section, to first slide the cover piece in the axial direction in the assembly of the wheel bearing until the inwardly angled section thereof engages the facing surface of the flange. Then, following the assembly of the wheel bearing, the cover piece may be slid back sufficiently that, on the one hand, the lubricant accumulating space is formed and, on the other hand, the sealing gap between the annular projection of the cover piece and the outer shoulder of the outer ring is formed.

In order to hold the cover piece to the outer surface of the flange, in accordance with a further embodiment of the invention, the cover piece of the flange is provided with circumferentially distributed recesses, in which corresponding sections of the cover piece are deformed. The recesses of the flange are advantageously formed as an annular groove on the flange. In order to improve the seal, in a further embodiment of the invention, the lubricant accumulation space between the flange of the outer ring and the cover piece is filled with an oil supplying material. This material is in the condition, to eventually absorb lubricant escaping from the bearing inner space and hold it, and thereby to inhibit it from further movement and eventually to the brake.

In a further embodiment of the seal arrangement in accordance with the invention, the seal element is comprised of a support body affixed to the outer ring, the support body preferably being of sheet metal. A seal body of elastic and oil resistant material is provided on the inner edge of the support body. The seal body has sealing lips. By this arrangement it is possible to use a higher quality material for the body portion of the seal, without increasing the cost of the seal. The prior disadvantage of using seal elements of high quality material is thereby overcome.

The seal elements of the invention are advantageously so formed that the support body has a sleeve-shaped mounting section which can be slid over an outer shoulder of the outer ring. The free end of the mounting section may be flanged, so that the flanged edge can engage an annular groove or the like in the outer bearing ring.

In accordance with a still further feature of the invention, a ring of sealing material may be provided between the support body and the opposite lying facing surface of the outer ring. In this manner the lubricant is inhibited from seeping between the adjacent surfaces of the support body and outer ring, as frequently occurs.

The sealing piece and the ring of sealing material can be joined to form a single component, whereby, in accordance with a further feature of the invention the support body is provided on its holding section with an annular body of elastic and oil resistant material. This latter annular body is snapped into an annular groove in the outer ring.

In order that the invention will be more clearly understood, it will now be disclosed in greater detail with reference to the accompanying drawings, wherein.

Figure 1:
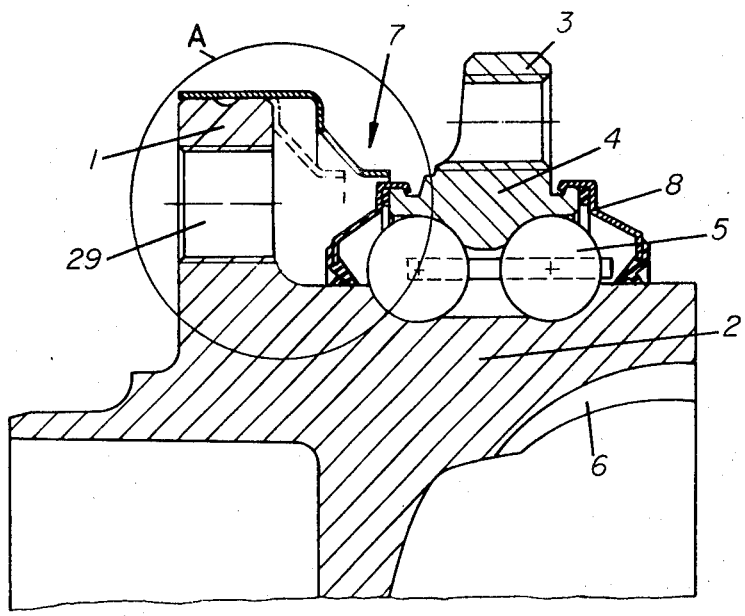
FIG. 1 is a longitudinal cross-section of a portion of a bearing to one side of the axis thereof.

Referring now to the drawings, and more in particularly to FIG. 1, therein is illustrated a cross-sectional view of a wheel bearing having an inner ring 2 provided with a radially outwardly directed flange 1, an outer ring 4 having a radially outwardly directed flange 3, and two rows of rolling bodies 5 arranged between the inner and outer ring. The outer ring is affixed to a vehicle (not shown) by the flange 3, and the flange 1 of the inner ring is adapted to be affixed to a wheel (not shown) and brake disc. In order to rotate the wheel, balls of a constant velocity joint (not shown) run in outer races 6 formed in the bore of the inner ring, so that the balls of the constant velocity joint transmit turning moments to the wheel.

In order to seal the wheel bearing, a seal 7 is provided on one side of the bearing and seal 8 is provided on the other side thereof.

The seal 7 is comprised of a seal element 9 (see FIG. 2) and a cover piece 10. The seal element 9 has a preferably annular support body 11, for example of sheet metal, and a sealing body 13 of elastic and oil resistant material is provided on the radially inner end 12 of the support body. The sealing body 13 has two sealing lips 14 and 15 which slidingly engage the shoulder surface 16 of the inner ring 2 between the flange 1 and the race thereon. As a result the portion of the sealing body 13 that serves the actual sealing function is much less than in prior arrangements wherein the whole sealing element is fabricated of this expensive material. As a consequence, the material cost and also the cost of the production of the seal is reduced. The support body 11 also serves the function in the assembly of the wheel bearing arrangement, of supporting the rolling bodies 5 of the adjacent row. The mounting section of the support body 11 has a sleeve-shaped section 17 which is slid over an outer shoulder 18 of the outer ring 4 and is inwardly flanged at its free end, so that the flanged end extends into a groove 19 in the outer ring and axially holds the seal element 9. In order to prevent the passage of lubricating means past the point at which the support body 11 is affixed to the outer ring, a ring 21 of sealing material is inserted between the support body 11 and the opposite lying facing surface 20 of the outer ring 4.

The cover piece 10 has a mounted section 22 slid over the outer surface 23 of the flange 1 of the inner ring, and a sleeve-shaped section 24 affixed thereto and extending axially therefrom. The free end 25 of the sleeve-shaped section 24 is angled inwardly toward the outer shoulder 18 of the outer ring 4 and terminates in a further axially directed annular projection 26. This annular projection 26 forms a narrow axially extending sealing space of radial dimension e with the outer shoulder 18 of the outer ring 4. The outer surface 23 of the flange 1 of the inner ring 2 has an annular groove 27, into which one or more parts of the holding section 22 are pressed following the assembly of the wheel bearing, in order to hold the cover piece 10 in the axial direction.

A lubricant space 28 is defined between the flange 1 of the inner ring 2 and the sleeve-shaped section 24 and angled end 25 of the cover piece 10. Lubricant escaping from the seal element 9 accumulates in the lubricant space 28, to avoid the danger of this lubricant being forced outwardly and, for example, entering the brake.

The seal 8 on the other side of the wheel bearing is, in the illustrated embodiment, formed in the same manner as the seal element 9. In a similar manner, the seal 8 is affixed to the outer ring on the side thereof away from the flange 1 of the inner ring. Due to the identical construction of the seal 8 and the seal element 9, on the one hand cost of production is reduced, and on the other hand, the bearing construction is simplified. This advantageously affects the price of the wheel bearing assembly as a whole. The seal 8 and seal element 9 may of course be formed differently, if necessary due to function and/or space requirements.

Figure 2:
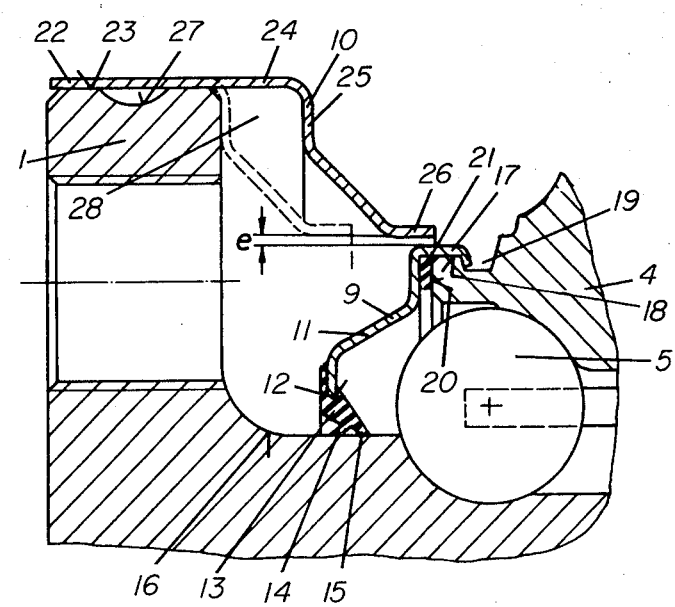
FIG. 2 is an enlarged cross-sectional view of the bearing of FIG. 1, taken in the circle A of FIG. 1.

In the assembly of the wheel bearing arrangement, the cover piece is first slid far enough on the flange 1 of the inner ring 2 that the angled end 25 thereof reaches the base of the interfacing side of the flange 1, as shown in dashed lines in FIGS. 1 and 2. Then the seal element 9 with the ring 21 likewise is slid sufficiently far that it extends axially on the shoulder surface 16 of the inner ring. The outer ring 4 is now pushed over the inner ring 1 and the balls guided between the two bearing rings with the so-called Conrad-arrangement, i.e., with a tilted and/or eccentrically displaced outer ring. Following the insertion of the balls and likewise a cage, the seal element 9 is slid onto the shoulder 18 of the outer ring, for example, by the insertion of a suitable tool through the circumferentially distributed fastening holes 29 in the flange 1 of the inner ring. The free ends of sleeve-shaped section 17 are then snapped into the groove 19. Then the cover piece 10 is slid to its final position and a portion of the mounting section 22 is deformed into groove 27. Without further explanation, it is also possible to roll the mounting section 22 throughout its circumference, in the groove 27. After filling of the bearing with lubricant, the seal 8 which, as above discussed is similar to the seal 9, is affixed to the outer ring 4. The wheel bearing arrangement is now ready for assembly on a vehicle.

As already discussed, it is possible to fill the inner space between the flange of the inner ring and the cover piece 10 completely or partly with a material that has the capability of supplying oil, which likewise absorbs lubricant escaping from the rolling bearing inner space, and prevents the further outward flow of this material.

Figure 3:
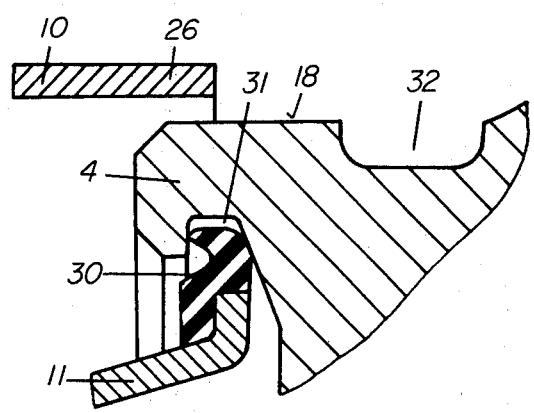
FIG. 3 is an enlarged cross-sectional view of a modification of a portion of the bearing of FIG. 1.

FIG. 3 illustrates another embodiment of the seal element 9 as well as a variation of the manner of affixing the seal element to the outer ring 4. The support body 11 is provided on its outer circumference with an annular body 30 of elastic and oil resistant material, preferably of the same material as that employed for the sealing body 30. The annular body 13 is snapped into the annular groove 31 in the outer ring 4. The groove 32 on the outer shoulder 18 of the outer ring 4 likewise accumulates rain water and the like falling upon the outside of the outer shoulder 18, and prevents this material from being forced into the axially extending sealing space between the projection 26 and outer shoulder 18. It will of course be understood that outer shapes may be employed for the sealing piece then as described above, and that other arrangement for affixing the elements together may also be employed.

What is claimed is:

1. In a bearing having an inner bearing ring with a first radially outwardly directed flange, an outer bearing ring with a second radially outwardly directed flange, a plurality of rolling bodies positioned to roll between said inner and outer rings, a seal affixed to said outer ring and having a free edge slidably engaging said inner ring, and a cover mounted to cover said seal; the improvement wherein said cover has a first portion mounted on said first flange, a free edge portion spaced from said first portion and extending to lie radially outward of an outer shoulder of said outer ring to form a narrow gap therebetween, and an intermediate portion between said first portion and edge portion defining a lubricant accumulation space, said intermediate portion having an axially extending sleeve-shaped section affixed to said first portion, and an angled section between said sleeve shaped section and free edge portion, said angle section extending in a substantially radially inwardly direction from said sleeve-shaped section toward said portion of said outer ring.

2. The bearing of claim 1 wherein said first portion of said cover is mounted on the radially outer surface of said first flange.

3. The bearing of claim 2 wherein the radially outer surface of said first flange has circumferentially distributed recesses, said first portion of said cover having portions extending into said recesses.

4. The bearing of claim 2 wherein the outer surface of said first flange has a circumferentially extending groove, and said first portion of said cover is deformed to extend into said groove.

5. The bearing of claim 1 wherein said seal comprises a support body held to said outer ring, and a sealing body of elastic and oil resistant material mounted on said support body and having sealing lips slidably engaging said inner ring.

6. The bearing of claim 5 wherein said support body has a sleeve-shaped portion slid over a shoulder of said outer ring and having a flange on the respective end thereof extending into an annular groove of said outer ring.

7. The bearing of claim 5 further comprising a ring of sealing material between said support body and an opposite lying facing surface of said outer ring.

8. The bearing of claim 5 further comprising an annular body of elastic and oil resistant material affixed to the radial outer end of said support body and snapped into an annular groove in said outer ring.

9. The bearing of claim 1 wherein said first cover portion has a first annular end portion radially engaging an outer radial surface of said first flange, said intermediate portion having an annular portion extending axially from said first portion and a second portion directed to extend at least partially radially inwardly from said annular portion toward said outer ring and terminating in said free edge portion.

10. The bearing of claim 1 wherein said seal has an annular support portion affixed to said outer ring and extending at least partially radially inwardly therefrom, and a sealing body of elastic and oil resistant material mounted to extend radially inward from the radial inner end of said support body and to slidably engage said inner ring.

11. In a rolling element bearing having an inner and an outer ring with races for guiding rolling elements therebetween, the inner and outer rings having radially outwardly extending first and second flanges respectively depending therefrom, and wherein a seal element affixed to the outer ring extends to sliding contact with the inner ring on the side of the races toward the first flange, the improvement comprising a cover having a first portion affixed to the outer periphery of said first flange, a second portion radially spaced from an outer shoulder of said outer ring to form a narrow gap therewith, and a third intermediate portion extending radially inwardly from said first portion to said second portion, said cover being axially spaced from the face of the first flange toward said second flange to define a lubricant retaining space between said face in said intermediate portion, whereby lubricant escaping from said races through the sliding contact of said seal is retained in said space and inhibited from escape externally of said bearing.

12. The bearing of claim 11 wherein said rolling elements comprise two rows of balls, said first portion of said cover being sleeve shaped and deformed into recesses in the outer periphery of said first flange to inhibit relative axial movement therebetween, said sleeve shaped portion being slideable over said first flange prior to deformation thereof into recesses to enable assembly of said balls in said races by relative tilting of the inner and outer rings.

* * * * *

UNITED STATES PATENT AND TRADEMARK OFFICE
CERTIFICATE OF CORRECTION

PATENT NO. : 4,408,809
DATED : October 11, 1983
INVENTOR(S) : WALTER ET AL.

It is certified that error appears in the above-identified patent and that said Letters Patent are hereby corrected as shown below:

In col. 3, line 57, change "mounted" to --mounting--.

In col. 4, line 60, change "30" to --13-- and "13" to --30--.

In col. 5, line 1, change "arrangement" to --arrangements--

Signed and Sealed this

Twenty-fifth Day of September 1984

[SEAL]

Attest:

GERALD J. MOSSINGHOFF

Attesting Officer

Commissioner of Patents and Trademarks